(12) United States Patent
Obayashi et al.

(10) Patent No.: US 7,758,253 B2
(45) Date of Patent: Jul. 20, 2010

(54) THRUST ROLLER BEARING

(75) Inventors: Kousuke Obayashi, Fukuroi (JP); Kazuyuki Yamamoto, Hamamatsu (JP)

(73) Assignee: NTN Corporation, Osaka (JP)

( * ) Notice: Subject to any disclaimer, the term of this patent is extended or adjusted under 35 U.S.C. 154(b) by 531 days.

(21) Appl. No.: 11/878,256

(22) Filed: Jul. 23, 2007

(65) Prior Publication Data

US 2008/0025661 A1 Jan. 31, 2008

(30) Foreign Application Priority Data

Jul. 27, 2006 (JP) ............................. 2006-205016

(51) Int. Cl.
*F16C 33/46* (2006.01)
(52) U.S. Cl. ...................................... 384/623
(58) Field of Classification Search ................. 384/621, 384/623
See application file for complete search history.

(56) References Cited

U.S. PATENT DOCUMENTS 3,226,170 A * 12/1965 Gerhard ....................... 384/623
3,240,542 A * 3/1966 Rudolf ......................... 384/623
3,240,543 A * 3/1966 Benson ........................ 384/623

FOREIGN PATENT DOCUMENTS

JP 2003-083333 3/2003

* cited by examiner

*Primary Examiner*—Thomas R Hannon
(74) *Attorney, Agent, or Firm*—Clark & Brody

(57) ABSTRACT

A thrust roller bearing comprises a plurality of cylindrical rollers each having a rolling surface on its side surface and a cage formed of a disk-shaped member having a hole formed in the center and comprising a plurality of pockets penetrating in a thickness direction for housing the rollers. The pocket has a plurality of stopper parts at a wall surface opposed to the rolling surface of said roller, and a plurality of guide parts between said adjacent stopper parts. When it is assumed that the distance between the outer wall surface of said pocket in the diameter direction and the guide part located on the outer side in the diameter direction of the two guide parts is $L_1$ and the distance between the inner wall surface of said pocket in the diameter direction and the guide part located inner side in the diameter direction of the two guide parts is $L_3$, it is satisfied that $L_1 > L_3$.

4 Claims, 4 Drawing Sheets

THRUST ROLLER BEARING

BACKGROUND OF THE INVENTION

1. Field of the Invention

The present invention relates to a thrust roller bearing and more particularly, to a thrust roller bearing used in a compressor for a car air conditioner, an automatic transmission, a manual transmission, a hybrid car and the like.

2. Description of the Background Art

A conventional thrust roller bearing 101 used in a compressor for a car air conditioner, an automatic transmission, a manual transmission, a hybrid car and the like is disclosed in Japanese Unexamined Patent Publication No. 2003-83333, for example. Referring to FIG. 7, the thrust roller bearing 101 disclosed in this document comprises a plurality of rollers 102, a track ring 103 holding the plurality of rollers in the axis direction and a cage 104 retaining the plurality of rollers 102.

In addition, the cage 104 has a pair of ring parts 104a and 104b and a plurality of pillar parts 104c formed between the ring parts 104a and 104b, and a pocket 104d holding the roller 102 is provided between the adjacent pillar parts 104c. The pillar part 104c forming the pocket 104d is bent into approximately M shape, in which stopper parts 104e are located on one side and the other side in the thickness direction of the cage 104 to hold the roller 102 and a guide part 104f is located between the adjacent stopper parts 14e to guide the rolling surface of the roller 102.

Here, according to the cage 104 used in the conventional thrust roller bearing 101, when it is assumed that the distance between the outer wall surface of the pocket 104d in a diameter direction and the guide part 104f positioned outside in the diameter direction is $l_1$, and the distance between the inner wall surface of the pocket 104d in the diameter direction and the guide part 104f positioned inside in the diameter direction is $l_3$, it is set such that $l_1 = l_3$ in general.

Recently, the compressor for the car air conditioner, the automatic transmission, the manual transmission, the hybrid car and the like have been further miniaturized and powered up, and the thrust roller bearing incorporated in those is desired to correspond to high speed. Meanwhile, since the lubricant oil amount is reduced for low-fuel consumption in view of environments and the lubricant oil having low viscosity is used, the thrust roller bearing is used under increasingly harsh conditions. Therefore, the wear (drilling wear) generated at the contact part between the outer end face of the roller in the diameter direction and the pocket wall surface at the time of bearing rotation has become a problem.

SUMMARY OF THE INVENTION

Thus, it is an object of the present invention to provide a thrust roller bearing in which wear generated at the contact part between a roller and a pocket is alleviated by using a cage that can appropriately guide the roller in the pocket.

A thrust roller bearing according to the present invention comprises a plurality of cylindrical rollers each having a rolling surface on its side surface and a cage formed of a disk-shaped member having a hole formed in the center and comprising a plurality of pockets penetrating in a thickness direction for housing the rollers. The pocket has a plurality of stopper parts for preventing the roller from escaping from the pocket, at a wall surface opposed to the rolling surface of the roller, and a plurality of guide parts for guiding the rolling surface of the roller, between the adjacent stopper parts, and when it is assumed that the distance between the outer wall surface of the pocket in the diameter direction and the guide part located on the outer side in the diameter direction of the plurality of guide parts is $L_1$ and the distance between the inner wall surface of the pocket in the diameter direction and the guide part located inner side in the diameter direction of the plurality of guide parts is $L_3$, it is satisfied that $L_1 > L_3$.

According to one embodiment, the stopper part comprises a first stopper part located on one side of the cage in the thickness direction, for preventing the roller from escaping to one side in the axial direction; and a second stopper part located on the other side of the cage in the thickness direction, for preventing the roller from escaping to the other side in the axial direction. The guide part is arranged between the first stopper part and the second stopper part so as to be inclined at a predetermined angle.

As described above, since the guide part is moved to the inside in the diameter direction, the movement of the outer end face of the roller in the diameter direction becomes free. As a result, a heat value at the contact part between the roller and the outer end face of the pocket in the diameter direction is lowered and the thrust roller bearing can have a long life under high-speed rotation and rare lubricant environments.

According to another embodiment, the cage is formed of a steel plate material. Furthermore, the present invention can be applied to a cage formed of an aluminum alloy or a resin.

According to still another embodiment, the end face of the roller has a configuration of "F" defined by JIS (Japanese Industrial Standards: B 1506). Furthermore, the present invention can be applied to a roller in which the end face having a configuration of "A" defined by JIS has a curved surface prominent in the rolling axis direction.

According to the present invention, since the guide part is moved to the inside in the diameter direction, the movement of the outer end face of the roller in the diameter direction becomes free. As a result, the heat value at the contact part between the roller and the pocket is lowered and the thrust roller bearing can have a long life under the high-speed rotation and rare lubricant environments.

DESCRIPTION OF THE PREFERRED EMBODIMENTS

A thrust roller bearing 11 according to one embodiment of the present invention will be described with reference to FIGS. 1 to 3 hereinafter. In addition, FIG. 1 is a plan view showing the thrust roller bearing 11 according to one embodiment of the present invention, FIG. 2 is a sectional view taken along a line II-II in FIG. 1, and FIG. 3 is an enlarged view showing a part P in FIG. 2.

Figure 1:
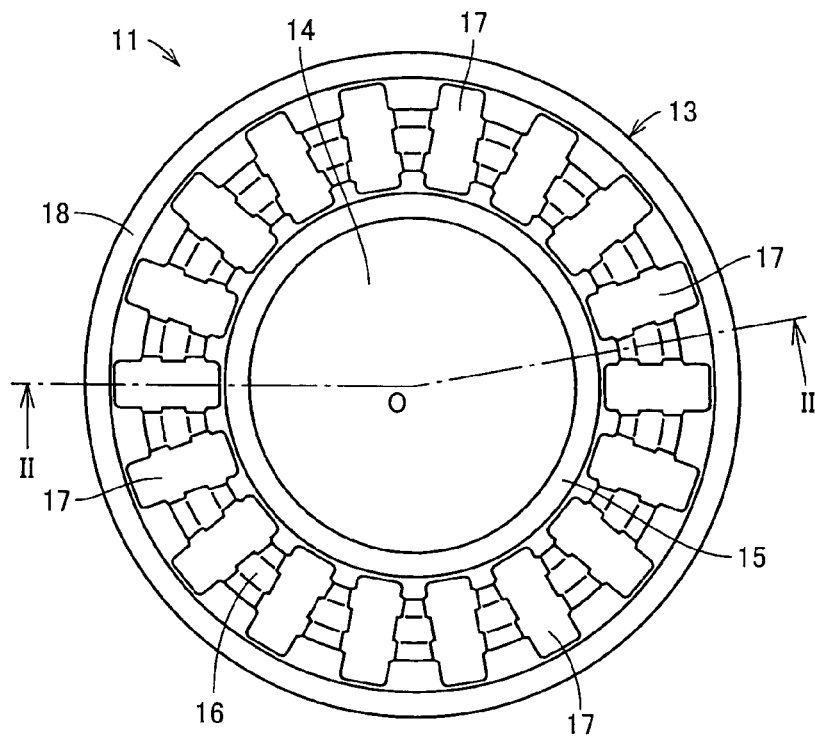
FIG. 1 is a plan view showing a thrust roller bearing according to one embodiment of the present invention.

First, referring to FIG. 1, the thrust roller bearing 11 is a cage & roller type bearing comprising a plurality of rollers (not shown) and a cage 13 holding the intervals of the adjacent rollers, and it is mainly used in a compressor for a car air conditioner, an automatic transmission, a manual transmission, a hybrid car and the like.

Figure 2:
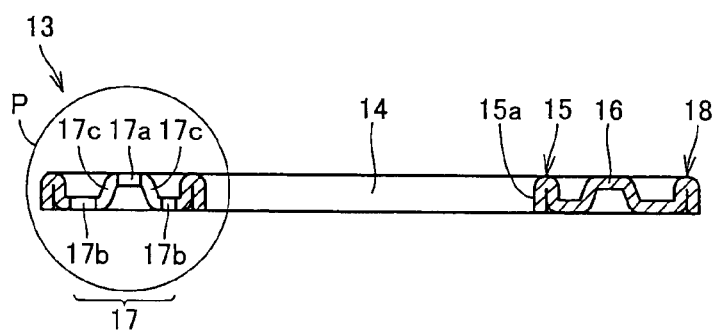
FIG. 2 is a sectional view taken along a line II-II in FIG. 1.
Figure 3:
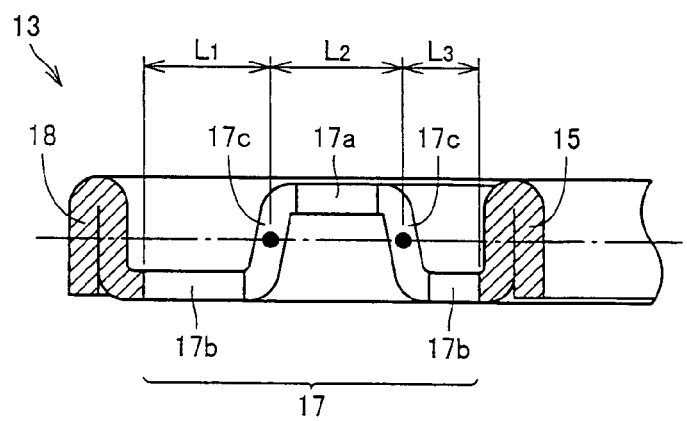
FIG. 3 is an enlarged view showing a part P in FIG. 2, in which the position of a guide part is shown.

Referring to FIG. 2, the cage 13 is a disk-shaped member in which a hole 14 is formed in the center and formed such that a metal flat plate is bent by pressing process and the like. Thus, it comprises an inner peripheral flange 15 formed along the outer periphery of the hole 14, an outer peripheral flange 18 formed along the outer periphery of the cage 13, and pillar parts 16 extending in a diameter direction so as to form a plurality of pockets for housing the rollers between the inner peripheral flange 15 and the outer peripheral flange 18.

The inner peripheral flange 15 is bent toward one side in the thickness direction of the cage 13 by a predetermined length and then folded back by 180°. In addition, the wall surface of the inner peripheral flange 15 opposed to the hole 14 functions as a guide surface 15a for guiding a shaft when it is incorporated in the shaft.

The outer peripheral flange 18 is positioned further outside of the outer wall surface of the pocket 17 in the diameter direction and bent toward one side in the thickness direction of the cage 13 by a predetermined length and folded back by 180° like the inner peripheral flange 15.

In addition, although the inner peripheral flange 15 and the outer peripheral flange 18 are not essential components in the present invention, when the inner peripheral flange 15 and the outer peripheral flange 18 are provided, the rigidity of the cage 13 is improved.

The pillar part 16 extends in the diameter direction, bending in the thickness direction of the cage 13, and the plurality of pockets 17 penetrating in the thickness direction are radially formed in its longitudinal direction from bearing rotation axis toward the diameter direction.

The pocket 17 is in the rectangular shape along the outline of the roller and the wall surface of the pocket 17 opposed to the rolling surface of the roller comprises a plurality of stopper parts 17a and 17b for preventing the roller from escaping from the pocket 17, and a plurality of guide part 17c for guiding the rolling surface of the roller, between the adjacent stopper parts 17a and 17b.

More specifically, the pocket 17 comprises the first stopper part 17a located in the center of the pocket 17 in the diameter direction on one side of the cage 13 in the thickness direction to prevent the roller from escaping to one side in the axis direction, the second stopper part 17b located at both ends of the pocket in the diameter direction on the other side of the cage 13 in the thickness direction to prevent the roller from escaping to the other side in the axis direction, and the guide parts 17c located at two parts between the first and second stopper parts 17a and 17b so as to be inclined at a predetermined angle.

The first and second stopper parts 17a and 17b project from the one wall surface toward the other wall surface of the pocket 17 in the longitudinal direction, abuts on the rolling surface of the roller and controls the displacement of the cage 13 in the axis direction.

Furthermore, referring to FIG. 3, when it is assumed that the distance between the outer wall surface of the pocket 17 in the diameter direction and the guide part 17c located on the outer side in the diameter direction of the two guide parts 17c is $L_1$, the distance between the two guide parts 17c is $L_2$, and the distance between the inner wall surface of the pocket 17 in the diameter direction and the guide part 17c located inner side in the diameter direction of the two guide parts 17c is $L_3$, they are set so as to satisfy $L_1 > L_3$. In addition, the above distances are measured in the center of the cage 13 in the thickness direction. That is, the length of the second stopper part 17b located on the outer side in the diameter direction is set to be longer than that of the second stopper part 17b located on the inner side in the diameter direction of the two second stopper parts 17b.

According to the thrust roller bearing 11 having the above constitution, the roller moves to the outside in the diameter direction in the pocket 17 by centrifugal force due to the rotation of the thrust roller bearing 11. Thus, when the movement of the end face of the roller to the outside in the diameter direction is set free by setting that $L_1 > L_3$, a heat value at the contact part between the roller and the pocket 17 is lowered, so that the thrust roller bearing can have a long life even under high-speed rotation and rare lubricating environments.

In addition, since the cage 13 is provided with the first and second stopper parts 17a and 17b at the pocket 17, the cage 13 is guided by rollers. Thus, since the wall surface of the cage 13 in the thickness direction and the track surface are not contacted, torque loss at the time of bearing rotation can be prevented and the lubricity between the wall surface of the cage 13 in the thickness direction and the track surface is improved. As a result, a heat value generated at the time of bearing rotation can be lowered.

In addition, although the above thrust roller bearing 11 comprises the cage having the approximately W-shaped section by bending a steel plate, the present invention is not limited to this, and any shape can be employed. For example, a cage 23 in which pockets are formed in a flat plate as shown in FIGS. 4 and 5 may be used.

A thrust roller bearing 21 according to another embodiment of the present invention will be described with reference to FIGS. 4 and 5. In addition, FIG. 4 is a plan view showing the thrust roller bearing 21 and FIG. 5 is a sectional view taken along a line V-V in FIG. 4. In addition, since the basic constitution of the thrust roller bearing 21 is the same as that of the thrust roller bearing 11 shown in FIGS. 1 to 3, common points are not described and different points will be mainly described.

Figure 4:
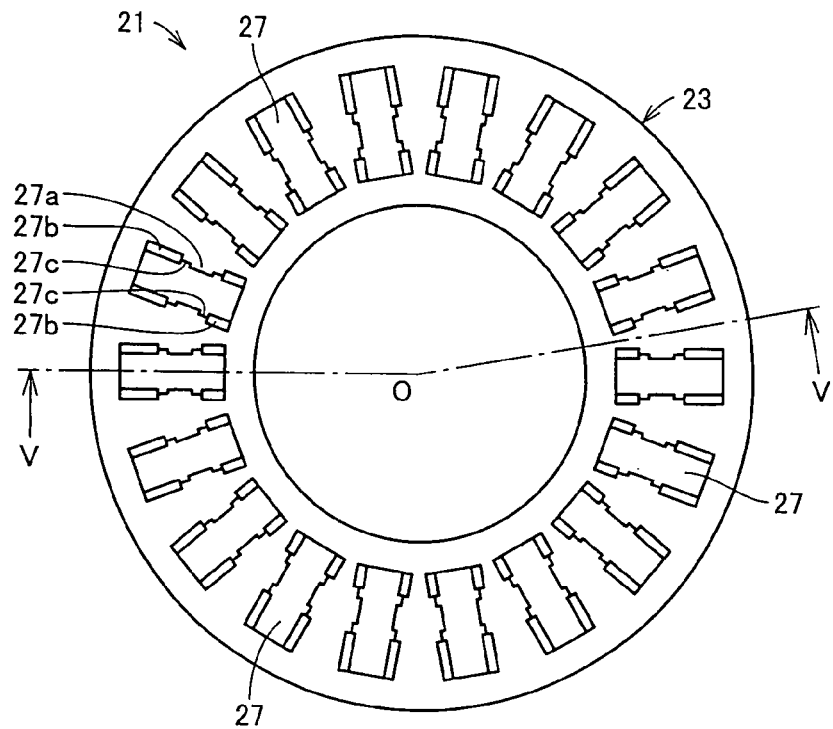
FIG. 4 is a plan view showing a thrust roller bearing according to another embodiment of the present invention.
Figure 5:
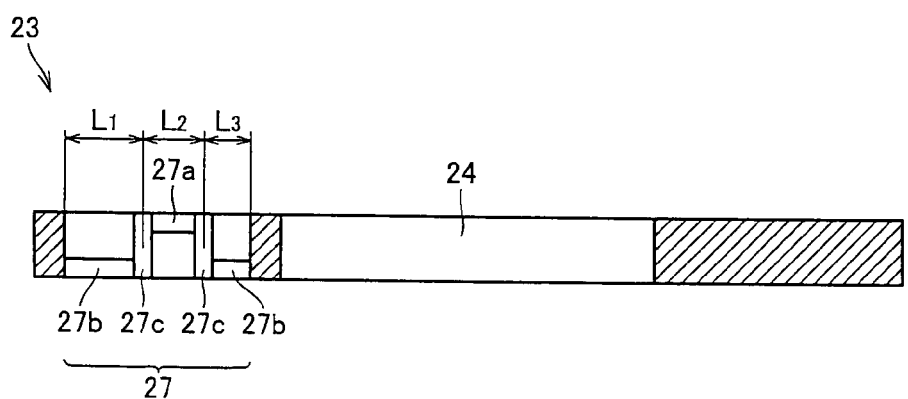
FIG. 5 is a sectional view taken along a line V-V in FIG. 4.

Referring to FIGS. 4 and 5, the thrust roller bearing 21 comprises a plurality of rollers (not shown) and a cage 23 holding the intervals of the adjacent rollers. The cage 23 is a disk-shaped member having a hole 14 formed in the center, and a plurality of pockets 27 penetrating in the thickness direction are arranged radially in its longitudinal direction from bearing rotation axis toward the diameter direction.

In addition, the wall surface of the pocket 27 opposed to the rolling surface of the roller comprises stopper parts 27a and 27b for preventing the roller from escaping from the pocket 27, and two guide parts 27c for guiding the rolling surface of the roller, between the adjacent stopper parts 27a and 27b. Furthermore, when it is assumed that the distance between the outer wall surface of the pocket 27 in the diameter direction and the guide part 27c located on the outer side in the diameter direction of the two guide parts 27c is $L_1$ and the distance between the inner wall surface of the pocket 27 in the diameter direction and the guide part 27c located inner side in the diameter direction of the two guide parts 27c is $L_3$, they are set so as to satisfy $L_1 > L_3$.

The present invention can be applied to the thrust roller bearing 21 having the cage 23 in which the pockets 27 are formed in the flat plate as described above. In addition, according to the thrust roller bearing 21, since the pockets are formed in one flat plate, the plate may be thick as compared with the cage 13 shown in FIGS. 1 and 2. When the plate is thick, rigidity can be provided without the inner peripheral flange and outer peripheral flange.

In addition, according to the roller, it has the rolling surface on its cylindrical side surface and the end face may be curved so as to be prominent in the rolling axis direction, or flat, or these may be combined. For example, it may have the shape of "A", "AR" or "F" defined by JIS (Japanese Industrial Standards: B 1506).

In addition, the cages 13 and 23 in the above embodiments may be formed by pressing a steel plate or aluminum alloy, or by cutting or injection-molding a resin material.

In addition, although the pockets 17 and 27 in the above embodiments comprise the first stopper parts 17a and 27a located in the center in the axis direction on one side in the thickness direction and the two second stopper parts 17b and 27b located at both ends in the axis direction on the other side in the thickness direction, respectively, the present invention is not limited to this. The stopper parts may be located at any positions so as to be capable of preventing the roller from escaping.

In addition, although the thrust roller bearing in the above embodiment is a cage & roller type bearing comprising the rollers and the cage, it may further comprise a track ring covering one or both in the axis direction.

Furthermore, the thrust roller bearing in the above embodiment may employ various kinds of rollers such as a needle roller, a cylindrical roller or a bar type roller as a rolling element. Especially, since the thrust needle roller bearing comprising the needle roller is small in thickness, the dimension of the supporting part in the axis direction can be effectively reduced.

Figure 6:
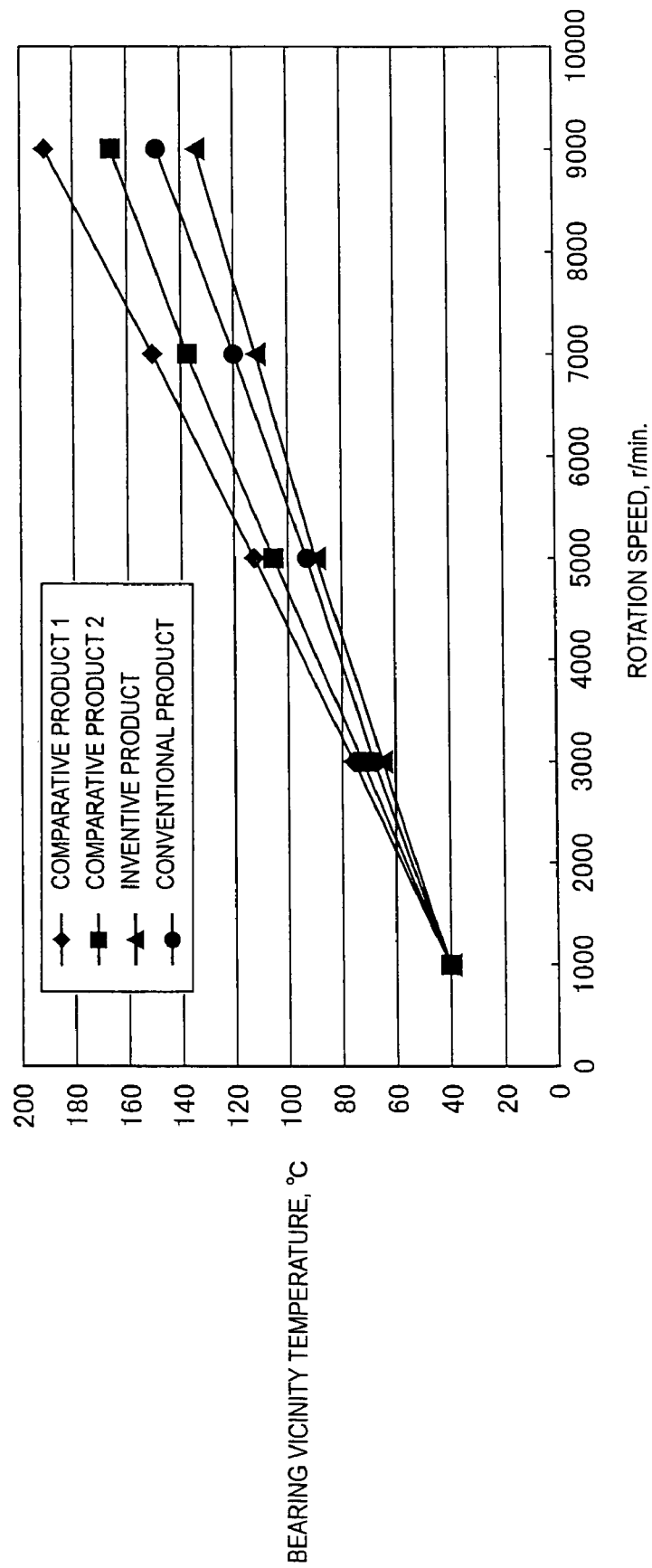
FIG. 6 is a view showing the result of a test performed to confirm the effect of the present invention.
Figure 7:
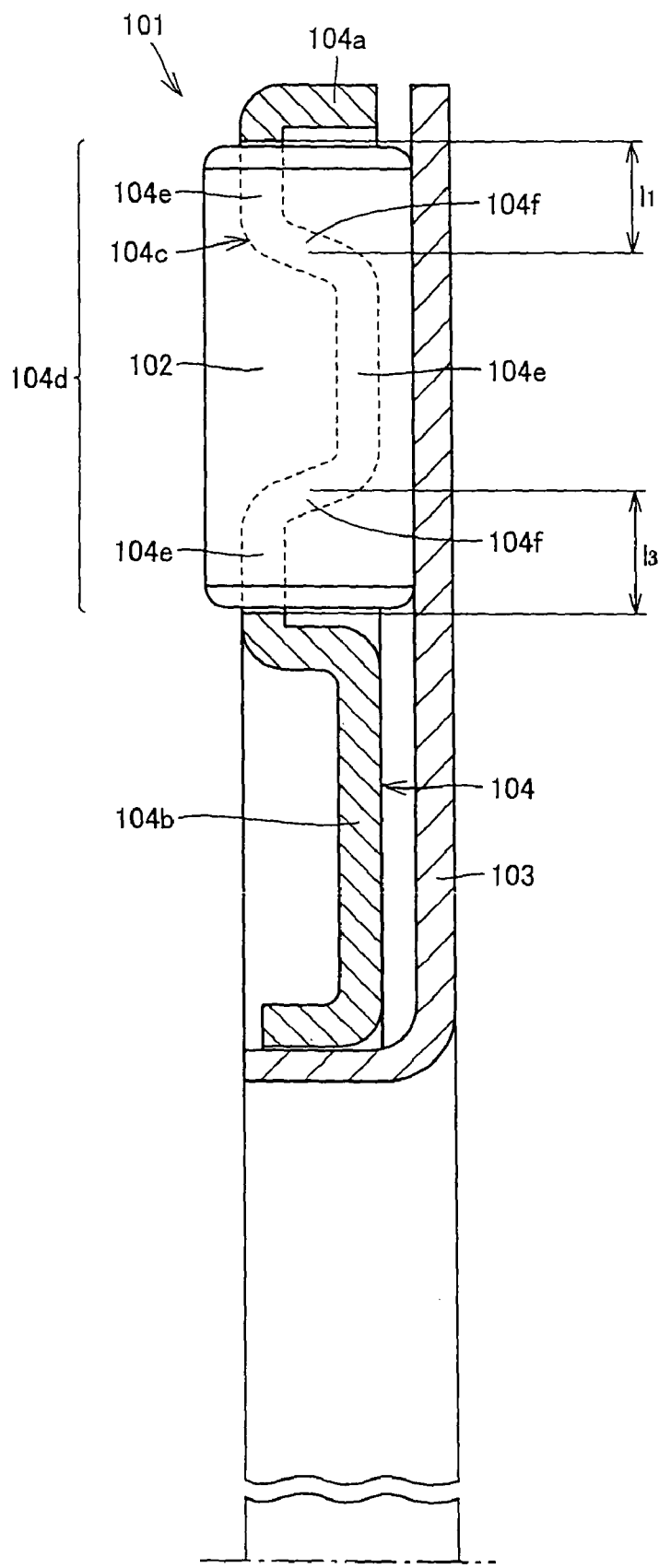
FIG. 7 is a view showing a conventional thrust roller bearing.

Next, a description will be made of a test performed to confirm the effect of the present invention with reference to Tables 1 to 4 and FIG. 6. Tables 1 to 3 are tables in which the dimensions and the like of the thrust roller bearings used in the effect confirming test are defined and Table 4 and FIG. 6 show the results of the effect confirming test.

TABLE 1

| ROLLER SIZE ROLLER DIAMETER(mm) × ROLLER LENGTH(mm) | L1 (%) | L2 (%) | L3 (%) |
|---|---|---|---|
| φ2.5 × 6.475 | 34.7 | 43.1 | 22.2 |
| φ2.0 × 3.8 | 37.7 | 40.4 | 21.9 |
| φ2.0 × 4.2 | 36.5 | 41.4 | 22.1 |
| φ2.5 × 4.2 | 36.2 | 41.8 | 22.0 |
| φ2.5 × 5.3 | 33.3 | 44.6 | 22.1 |
| φ3.0 × 4.5 | 36.1 | 41.2 | 22.7 |
| φ3.0 × 5.3 | 34.2 | 43.0 | 22.8 |
| φ3.0 × 7.8 | 31.7 | 44.2 | 24.1 |
| φ4.0 × 6.0 | 34.2 | 41.6 | 24.2 |
| φ4.0 × 8.8 | 31.7 | 43.4 | 24.9 |

TABLE 2

| ROLLER SIZE ROLLER DIAMETER(mm) × ROLLER LENGTH(mm) | L1 (%) | L2 (%) | L3 (%) |
|---|---|---|---|
| φ2.5 × 6.475 | 28.5 | 43.1 | 28.5 |
| φ2.0 × 3.8 | 29.8 | 40.4 | 29.8 |
| φ2.0 × 4.2 | 29.3 | 41.4 | 29.3 |
| φ2.5 × 4.2 | 29.1 | 41.8 | 29.1 |
| φ2.5 × 5.3 | 27.7 | 44.6 | 27.7 |
| φ3.0 × 4.5 | 29.4 | 41.2 | 29.4 |
| φ3.0 × 5.3 | 28.5 | 43.0 | 28.5 |
| φ3.0 × 7.8 | 27.9 | 44.2 | 27.9 |
| φ4.0 × 6.0 | 29.2 | 41.6 | 29.2 |
| φ4.0 × 8.8 | 28.3 | 43.4 | 28.3 |

TABLE 3

| ROLLER SIZE ROLLER DIAMETER(mm) × ROLLER LENGTH(mm) | L1 (%) | L2 (%) | L3 (%) |
|---|---|---|---|
| φ2.5 × 6.475 | 22.2 | 43.1 | 34.7 |
| φ2.0 × 3.8 | 21.9 | 40.4 | 27.7 |
| φ2.0 × 4.2 | 22.1 | 41.4 | 36.5 |
| φ2.5 × 4.2 | 22.0 | 41.8 | 36.2 |
| φ2.5 × 5.3 | 22.1 | 44.6 | 33.3 |
| φ3.0 × 4.5 | 22.7 | 41.2 | 36.1 |
| φ3.0 × 5.3 | 22.8 | 43.0 | 34.2 |
| φ3.0 × 7.8 | 24.1 | 44.2 | 31.7 |
| φ4.0 × 6.0 | 24.2 | 41.6 | 34.2 |
| φ4.0 × 8.8 | 24.9 | 43.4 | 31.7 |

First, in Tables 1 to 3, the ratio of the distance ($L_1$) between the outer wall surface of the pocket in the diameter direction and the guide part 17c located on the outer side in the diameter direction, the distance ($L_2$) between the two guide parts 17c located at two positions, and the distance ($L_3$) between the inner wall surface of the pocket in the diameter direction and the guide part 17c located inner side in the diameter direction, to the dimension of the pocket 17 in the diameter direction are defined with respect to each size of the thrust roller bearing used in the effect confirming test.

In addition, Table 1 regards the thrust roller bearing according to one embodiment of the present invention in which it is set such that $L_1>L_3$ (inventive product), Table 2 regards the conventional general thrust roller bearing in which it is set such that $L_1=L_3$ (conventional product), Table 3 regards a thrust roller bearing in which it is set such that $L_1<L_3$ as a comparative example with the thrust roller bearing shown in Table 1 (comparative product 1). In addition, the test has been performed for a thrust roller bearing (comparative product 2) that is the same as the conventional general thrust roller bearing ($L_1=L_3$) but the $L_2$ is larger than that shown in Table 2.

In addition, the thrust roller bearing having the size φ3.0 (mm)×7.8 (mm) is used among those shown in Tables 1 to 3 and the comparative product 2 having the same size is used. As the test condition, when it is assumed that basic dynamic load rating is C (kN) and bearing load is P (kN), under load P/C=0.2, bearing vicinity temperatures were measured at various rotation speeds such as 1000 (r/min), 3000 (r/min), 5000 (r/min), 7000 (r/min), and 9000 (r/min). In addition, ATF oil was used as a lubricant agent and its circulation was controlled under 100 ml/min. The test result is shown in Table 4 and FIG. 6. In addition, the temperatures shown in Table 4 were provided such that the above tests were performed for the bearings (inventive product, conventional product, comparative product 1 and comparative product 2) ten times and the results were averaged.

TABLE 4

| | BEARING VICINITY TEMPERATURE (° C.) | | | |
|---|---|---|---|---|
| ROTATION SPEED (r/min.) | INVENTIVE PRODUCT | CONVENTIONAL PRODUCT | COMPARATIVE PRODUCT 1 | COMPARATIVE PRODUCT 2 |
| 1000 | 41.6 | 40.1 | 39.8 | 40.5 |
| 3000 | 65.4 | 68.9 | 76.1 | 72.9 |
| 5000 | 89.8 | 93.2 | 112.9 | 105.5 |
| 7000 | 112.6 | 120.1 | 150.1 | 137.2 |
| 9000 | 134.6 | 148.8 | 190.3 | 165.8 |

Referring to Table 4 and FIG. 6, the bearing vicinity temperature of the inventive product is lowest in the test and the bearing vicinity temperature of the comparative product 1 set such that $L_1<L_3$ is highest at the rotation speed 3000 (r/min) or more. Namely, it has been confirmed that the more the movement of the end face facing the outside in the diameter direction of the roller is free, the lower the heat value at the contact part between the roller and pocket is.

In addition, according to the difference in bearing vicinity temperatures (difference between the maximum temperature and the minimum temperature) at each rotation speed, it has been confirmed that while there is almost no difference such as 1.8° C. regarding the bearing vicinity temperature at the rotation speed 1000 (r/min), the difference becomes larger as the rotation speed becomes high such that it is 10.7° C. at 3000 (r/min), 23.1° C. at 5000 (r/min), 37.5° C. at 7000 (r/min), and 55.7° C. at 9000 (r/min). That is, it has been confirmed that the inventive product provides a more advantageous effect under the high-speed rotation environment.

Referring to Tables 1 and 2, according to the thrust roller bearing in one embodiment of the present invention, while the $L_1$ is set to be longer by 3.4% to 7.9% than the conventional thrust roller bearing, the $L_3$ is set to be shorter by 3.4% to 7.9% than the conventional thrust roller bearing. Thus, the position of the guide part can be moved inside in the diameter direction as compared with the conventional one.

In addition, according to the thrust roller bearing in one embodiment of the present invention shown in Table 1, the $L_1$ is 1.27 to 1.72 times as long as the $L_3$ and according to the thrust roller bearing used in the effect confirming test, the $L_1$ is about 1.31 times as long as the $L_3$. When this value is too small ($L_1 \approx L_3$), the effect of the present invention is hardly provided. Meanwhile, when this value is too great ($L_1 \gg L_3$), the behavior of the roller in the pocket becomes unstable.

In addition, although the $L_2$ is about 40% to 45% of the dimension of pocket in the diameter direction in the thrust roller bearing according to one embodiment of the present invention shown in Table 1, when this value is too great, the $L_1$ cannot be sufficiently increased and it is difficult to provide the effect of the present invention. Meanwhile, it is difficult to further decrease this value in view of the processing of the stopper part.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

The present invention can be advantageously applied to the thrust roller bearing for supporting the compressor for the car air conditioner, the automatic transmission, the manual transmission, the hybrid car and the like.

What is claimed is:

1. A thrust roller bearing comprising:
   a plurality of cylindrical rollers each having a rolling surface on its side surface; and
   a cage formed of a disk-shaped member having a hole formed in the center and comprising a plurality of pockets penetrating in a thickness direction for housing the rollers, wherein
   said pocket has a plurality of stopper parts for preventing said roller from escaping from said pocket, at a wall surface opposed to the rolling surface of said roller, and a plurality of guide parts for guiding the rolling surface of said roller, between said adjacent stopper parts, and
   when it is assumed that the distance between the outer wall surface of said pocket in the diameter direction and the guide part located on the outer side in the diameter direction of said plurality of guide parts is $L_1$ and
   the distance between the inner wall surface of said pocket in the diameter direction and the guide part located inner side in the diameter direction of said plurality of guide parts is $L_3$, it is satisfied that $L_1 > L_3$.

2. The thrust roller bearing according to claim 1, wherein said stopper part comprises:
   a first stopper part located on one side of said cage in the thickness direction, for preventing said roller from escaping to one side in the axial direction; and
   a second stopper part located on the other side of said cage in the thickness direction, for preventing said roller from escaping to the other side in the axial direction, and
   said guide part is arranged between said first stopper part and said second stopper part so as to be inclined at a predetermined angle.

3. The thrust roller bearing according to claim 1, wherein said cage is formed of a steel plate material.

4. The thrust roller bearing according to claim 1, wherein the end face of said roller has a configuration of "F" defined by JIS.

* * * * *